March 14, 1933.　　　W. S. SOUTHWICK　　　1,901,477
FABRIC WELDING MACHINE
Filed June 7, 1930　　　5 Sheets-Sheet 1

Fig. 1.

Inventor:
William S. Southwick

March 14, 1933.  W. S. SOUTHWICK  1,901,477
FABRIC WELDING MACHINE
Filed June 7, 1930   5 Sheets-Sheet 5

Inventor:
William S. Southwick

Patented Mar. 14, 1933

1,901,477

UNITED STATES PATENT OFFICE

WILLIAM S. SOUTHWICK, OF LYNN, MASSACHUSETTS, ASSIGNOR TO THOMSON-GIBB ELECTRIC WELDING COMPANY, OF LYNN, MASSACHUSETTS, A CORPORATION OF MASSACHUSETTS

FABRIC WELDING MACHINE

Application filed June 7, 1930. Serial No. 459,804.

This invention relates to machines for electrically welding wire fabric, the latter comprising continuous, spaced, longitudinal or strand wires with spaced, transverse, cross or stay wires welded thereto at the crossing points. Such fabric may be employed for a great variety of purposes, such as concrete reinforcement, fences, mats, lathing, etc. The object of the invention is to improve and simplify the construction and operation of such machines in respects hereinafter more particularly pointed out.

The invention will be best understood by reference to the following description when taken in connection with the accompanying illustration of one specific embodiment thereof, while its scope will be more particularly pointed out in the appended claims.

Figure 1:
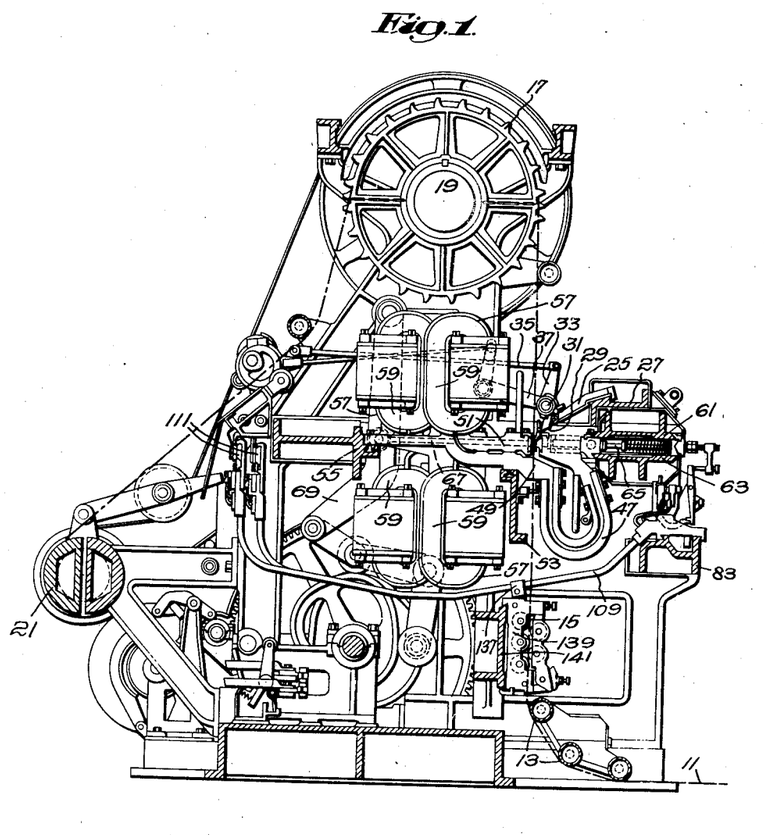
Fig. 1 is a cross-sectional elevation of a wire fabric, welding machine employing the herein described improvements.

Referring to the drawings, and more particularly to the cross-sectional elevation shown in Fig. 1, the invention is illustrated as embodied in a machine of the general type and construction disclosed in prior Patents Nos. 813,823 and 814,392, dated February 27 and March 6, 1906, respectively. Since the operation of the herein disclosed machine as to many of its functions, including the guiding and feeding of the strand wires, the feeding of the stay or cross wires to the wire receiving devices, the cutting of the stay wire and its transfer to a position against the strand wires and between the welding jaws, may be carried out by mechanisms substantially similar to those described in the aforesaid patents, no detailed illustration of such mechanisms is necessary and it will suffice to give a general description of the action of the machine by reference to Figs. 1, 2 and 3 herein, supplemented by a more detailed description of the improvements herein provided.

In the operation of the machine a series of spaced, continuous, strand wires 11, supplied from any suitable source, are fed step by step through the machine, passing over the guide rollers 13 and advancing upwardly between straightening and tensioning rollers 15. Passing thence upwards, each between a pair of welding jaws, the strand wires, after the cross or stay wires have been welded thereto, pass over a guiding and feeding device at the top of the machine comprising spaced wheels 17 each grooved to receive the strand wires and toothed to engage the stay wires, these wheels being fixed on the shaft 19 but adjustable lengthwise the shaft to adapt them to variations of the spacing in the strand wires. This feeding device advances the fabric and the stay wires step by step, and the finished fabric is then delivered to the winding roll 21 at the back of the machine.

At each step of the feeding movement, a length of stay wire 23 (Fig. 3) is fed transversely into the machine and into engagement with successive members of a series of wire receiving or holding arms, which may be of a construction shown in the aforesaid patents, one of these arms being shown at 25 in Fig. 1. The receiving arms should be suitably spaced for guiding the stay wires and are adjustably secured to the stationary horizontal frame member 27 which extends transversely across the front of the machine. When the length of stay wire has been positioned in the receiving arms it is severed from the main supply. The stay wire feeding and severing mechanisms may be of the construction shown in either of the above mentioned patents and are not herein illustrated.

After the stay wire has been positioned as described in its receiving arms, it is then engaged by a series of transfer fingers 29, which may also be of a construction similar to that illustrated in the aforesaid patents. The transfer fingers serve to transfer the stay wire to a position in which it lies across the successive strand wires and between the welding jaws preparatory to the welding operation, which takes place when the strand wires are brought to rest.

The transfer fingers preferably correspond in number to the number of receiving arms and are non-rotatably fixed on the rock shaft 31 but adjustable lengthwise the same. The rock shaft 31 is given a movement to impart the necessary positioning movement to the series of fingers 29, such movement of the shaft being compounded of a rocking movement imparted through the arm 33 and the reciprocated link 35 and a movement of translation imparted through the reciprocating bell-crank lever 37.

The welding jaws (see Figs 3 to 5) are carried by a series of stationary jaw members and a series of movable jaw members, the same presenting successive pairs of opposed cooperating welding jaws, each constituting the two electrodes of a secondary welding circuit. The number of such pairs of jaws corresponds to the number of strand wires and the jaws are spaced transversely the machine similar to the spacing of the strand wires.

Figure 3:
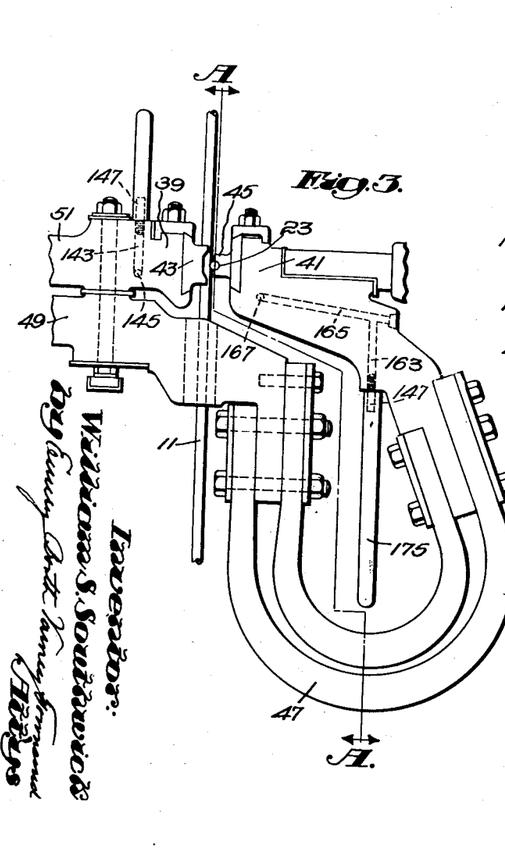
Fig. 3 is a side elevation, also on an enlarged scale, showing one pair of the welding jaw members with the pipe connections therefor to convey the cooling fluid thereto.
Figure 5:
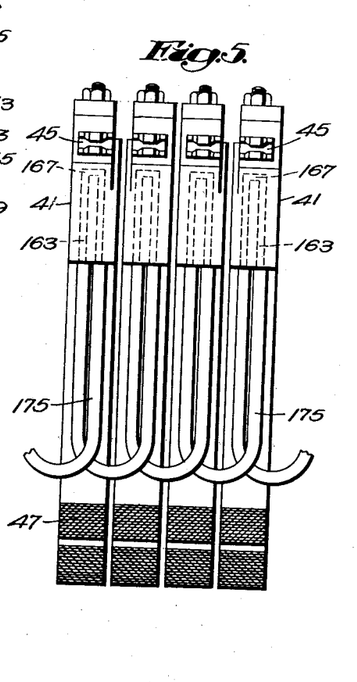
Fig. 5 is a similar section in elevation on the line A—A in Fig. 3, looking toward the movable jaws.

Each movable jaw member comprises the die or jaw holding arm 41 of copper or other conductive metal and the die 45 or jaw proper which is horizontally grooved to receive the transverse stay wire. The jaw holding arm 41 is electrically connected by double, flexible loops of thin copper strips 47 to a horizontal secondary conductor bar 49, constituting one terminal of the secondary circuit of a transformer.

Figure 4:
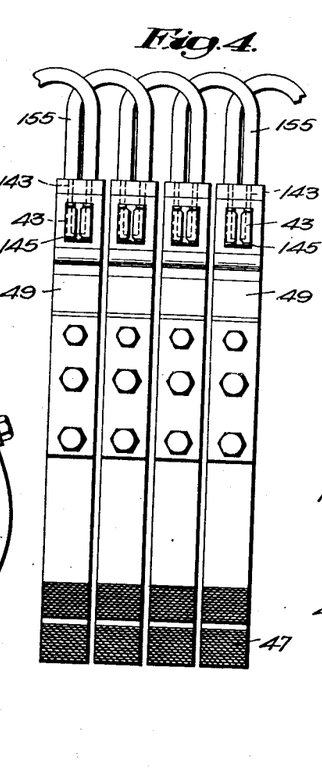
Fig. 4 is a section in elevation on the line A—A in Fig. 3, looking toward and showing four of the series of stationary jaws.

Each stationary jaw member comprises the jaw holding arm 39 and the die 43 or jaw proper which is vertically grooved to receive the opposed vertical strand wire 11. The holding arm 39 is formed by an extension of the horizontal secondary conductor bar 51, constituting the other terminal of the secondary circuit. The two bars are supported (Fig. 1), one above the other, upon the two parallel horizontal frame members or rails 53 and 55 extending transversely across the entire width of the machine, the two bars being insulated from their supporting rails and from each other.

The secondary terminal bars of each pair are connected to opposite terminals of a secondary transformer circuit, the latter being composed of one or more copper coils 57 of relatively large cross section which are inductively related to the primary circuit winding 59.

The transformers are supported by the horizontal terminal bars, which in turn are supported by the transformer rails 53 and 55, the bars, however, being supported for adjustment lengthwise the rails so that the spacing of the transformers and the jaws together may be varied to suit the spacing of the strand wires and the character of the fabric being formed. As in the aforesaid patents, however, the transformers are arranged in staggered or alternating relationship both vertically and horizontally, so that a compact arrangement is provided, with a transformer and its secondary terminal bars provided for each pair of welding jaws.

In effecting the weld the entire series of movable welding jaws is advanced as a unit by means of a reciprocating carrier, each movable jaw forcing the transverse stay wire against one of the vertical strand wires, which is in contact with the stationary jaw, after which the primary circuit is closed by means of a cam actuated switch (not shown), causing a current to pass through the point of contact to raise the temperature of the two wires to a welding heat. Each jaw is so connected to the carrier that as the metal softens it is forced forwardly under pressure of a spring, thereby providing an upsetting movement. Primary circuit breaking switches are provided, one for each pair of jaws, such that the advance of the movable jaw under its upsetting movement automatically breaks the primary circuit, interrupting the welding current. After each pair of jaws has thus functioned, the entire series of movable jaws is moved back again by the carrier from the closed to the open position, the reverse movement of each jaw serving again to close the primary circuit breaking switch preparatory to welding the next stay wire to be introduced into the machine.

The movable carrier for the series of movable jaws comprises two parallel, horizontal rails or plates 61 and 63 (Figs. 1 and 2) extending across the front of the machine below the frame member 27 and united at their opposite ends to move as a unit but presenting between them a slot in which the jaw actuating rods 65 are carried. The jaw carrier is mounted in horizontal guideways at opposite sides of the machine and is given a suitably timed, reciprocating movement to advance and retract the movable jaws with relation to the stationary jaws. This reciprocating movement is effected by actuating devices comprising a rod 67 (Fig. 1) connected to the cam actuated lever 69, one such actuating device being provided at each end of the carrier.

So far as described the machine herein illustrated is constructed and operates substantially the same as the machines illustrated in the aforesaid prior patents.

In the illustrated embodiment of the invention, however, the series of primary circuit breaking switches actuated by movement of the jaws, instead of being located, as in the aforesaid patents, above the series of stationary jaws, back of the strand wires, transfer devices and other moving parts where access for purposes of adjustment is difficult and where the space is restricted, are placed at the front of the machine immediately below the jaw carrier where they are open to view and are readily accessible and where their actuation is simplified and rendered more certain.

This permits the space back of the strand wires and above the stationary jaws to be utilized, as hereinafter described, for the provision of a series of conduits connecting successive members of the stationary jaws for supplying water or other cooling fluid thereto, a similar cooling provision being also made for the series of movable jaws.

Figure 2:
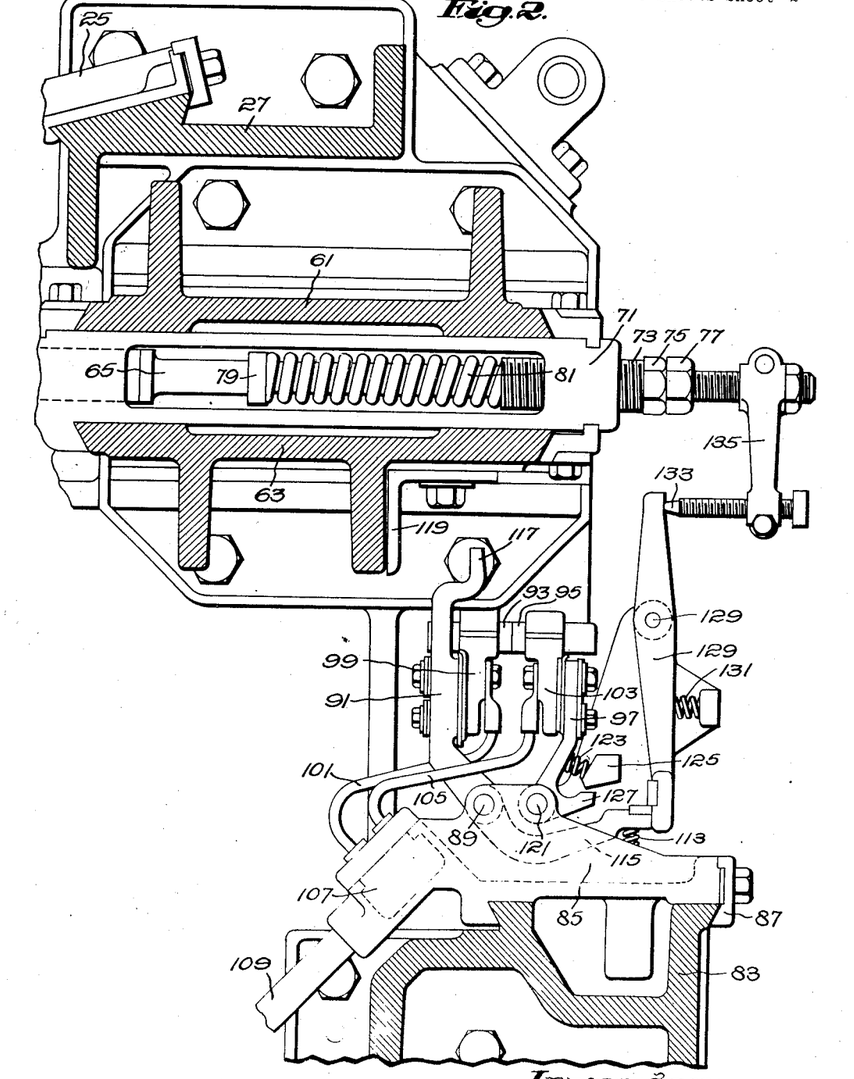
Fig. 2 is an enlarged, cross-sectional elevation taken through the movable jaw carrier at the front of the machine and showing the relation of the latter to one of a series of circuit breaking devices which are actuated coordinately with the movement of the welding jaws.

According to the construction shown in Figs. 1 and 2, each movable jaw is secured to the end of its actuating rod 65 which is supported in a cage 71 (Fig. 2), the latter being adjustably clamped in the slot between the upper and lower plates 61 and 63 so as to permit of its adjustment lengthwise the carrier and transversely of the machine. The forward end of the actuating rod is guided to slide in the forward end of the cage and the rear end thereof to slide in a sleeve 73. The latter is threaded into the rear end of the cage and is provided with a hexagonal or other head 75 projecting from the cage at the front of the machine. The end of the actuating rod projects through and beyond the sleeve 73 and has its end threaded to receive a nut 77 adapted to seat against the head 75 of the sleeve.

Interposed between a collar 79 fixed on the rod 65 and the end of the sleeve 73 is a coiled spring 81 encircling the rod and adapted to force the latter forward to cause the nut 77 to seat against the head of the sleeve, thus fixing the position of the jaw and rod in relation to the carrier when the latter is retracted. When the carrier is moved to advance the jaw, each jaw is forced against the cross or stay wire and brought to rest. Continued movement of the carrier compresses the spring 81, the abutting head 75 of the sleeve withdrawing from the stop nut 77. As the metal of the strand and stay wires softens under the action of the welding current, the spring causes the jaw and actuating rod to move forward, providing the necessary upsetting pressure. On the return movement of the carrier, the abutment 75 again engages the stop nut 77 and the jaws then retract with a further retracting movement of the carrier.

The provision of the adjustable abutment on the carrier in the form of the threaded sleeve, cooperating with the adjustable stop on the actuating rod in the form of the nut 77, provides means whereby a complete adjustment may be had of the relation between the jaw and the carrier, the upsetting movement of the jaw and the tension of the spring.

In the upsetting movement of the jaw, each actuating rod is caused to break the primary circuit for that particular pair of jaws. In the retracting movement of the jaw the circuit breaker is restored to and locked in its closed position preparatory to the next forward jaw movement.

The entire series of circuit breaking switches, one for each pair of jaws, is herein mounted on the transverse frame member 83 which extends entirely across the front of the machine beneath the jaw carrier. Each circuit switch is provided with a base 85 supported on guideways on the frame member and clamped in fixed position thereon by the clamping piece 87 so that it may be adjusted lengthwise the frame member to adapt its position to any readjusted position of the corresponding welding jaws.

Pivoted at 89 on the base 85 of each switch member is the upright swinging contact arm 91 having the contact 93 adapted to engage and seat against the cooperating, yieldably mounted contact 95, the latter secured to the upright contact supporting arm 97. The contact 93 is secured to the terminal lug 99 carried by the arm 91, the contact and lug being insulated from the arm. The lug is electrically connected to the primary circuit conductor 101. The contact 95 is likewise secured to a terminal lug 103 carried by the arm 97 but insulated therefrom, the lug being electrically connected to the primary circuit conductor 105. The conductors 101 and 105 which comprise a part of the primary transformer circuit enter the cable condulet 107 carried by the base 85 and through means of the cable 109 are carried through the body of the machine (Fig. 1) to the back thereof where the various conductors have connection with the bus bars 111 and transformers primary circuit windings 59.

The movable contact 93 is normally thrown to an open position by means of the spring 113 seated in the base 85 and acting on the underside of the lever arm 115 connected to the movable contact carrier arm 91. The arm 91, however, has an upward extension terminating in the upright finger 117 which lies within the path of the depending lug 119 carried by the plate 63 of the jaw carrier, the relation of the finger and the lug being such that on the return or jaw opening movement of the carrier the lug engages the finger and throws the contact arm 91 to a contact closing position, forcing the contact 93 against the contact 95.

To assure a firm seat between the contacts 93 and 95, the supporting arm 97 for the latter is pivoted at 121 and is permitted a slight yielding movement backward against the spring 123 seated against the fixed lug 125. A finger 127 carried by the arm 97 and underlying the lug 125 limits the movement of the arm 97 when the seating pressure of the movable contact 93 is removed.

When the movable contact arm is thrown to its closed position by the lug 119, it is held locked in that position by the latch lever 128 pivoted at 129 on an upright part of the base 85. The latch lever is forced toward a latching position by the spring 131 so that on the closing movement of the contact arm a shouldered part of the lower end of the latch lever slips over the end of the lever arm 115 and holds the contacts closed, in which position they remain until the forward upsetting movement of the jaws takes place. When this occurs, the latch is thrown to release the movable contact arm, this being effected by engagement between the upper end of the latch lever and the end of a releasing pin 133 which is carried forward by the projecting end of the jaw actuating rod 65. The releasing pin is threaded into the lower end of the depending arm 135, which in turn is adjustably secured to the threaded protruding end of the rod 65, so that the point at which release takes place and the current is interrupted is susceptible of exact adjustment with relation to the upsetting movement of the jaw.

When the upsetting movement occurs and the latch is released, the spring 113 throws open the movable contact breaking the primary circuit thereat, the opening movement of the arm being limited by contact between the end of the lever arm 115 and the stationary lug 125.

It will be seen that the location of the jaw-actuated, circuit breaking switches at the front of the machine provides such ample space for the switches that the parts thereof may be of relatively large and substantial size and may be actuated in their opening and closing movements by devices carried directly by the jaw carrier and the protruding ends of the actuating rods, providing for certainty and simplicity in operation and providing further for ready inspection and access for purposes of adjustment.

Figure 7:
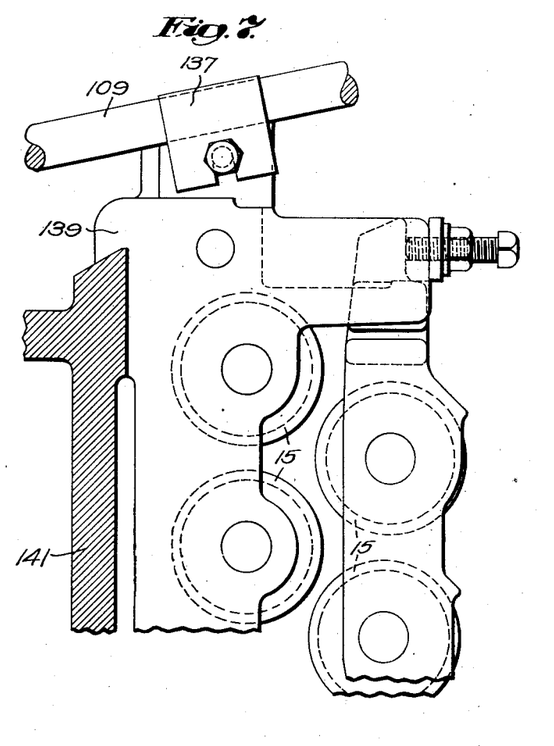
Fig. 7 is a side elevation of one of the adjustable strand wire guides showing the connected device for supporting the corresponding cable for the primary circuit.
Figure 8:
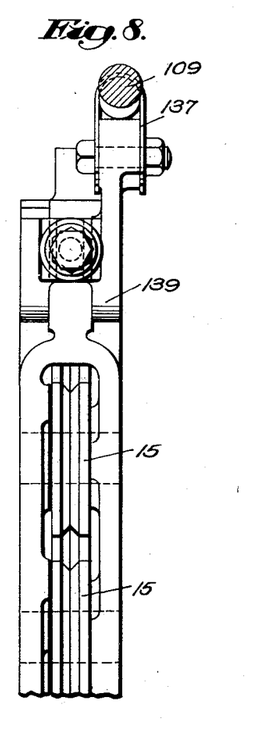
Fig. 8 is a front elevation of the strand wire guide shown in Fig. 7.

It is desirable that the rearwardly extending cables 109 should be spaced, guided and kept free from interference with the vertical strand wires, and further that when adjustment is made to vary the spacing between the strand wires, jaws and other cooperating parts, the cables should be kept spaced to conform to such adjustment. In the described embodiment of the invention each cable 109 (see Figs. 1, 7 and 8) is secured to a clip or holder 137 fastened to an extension on the upper side of the bracket 139 carrying the straightening and tensioning rollers 15 which engage the corresponding strand wire for the series. The series of brackets is adjustably clamped to the face of a transverse frame member 141 extending across the machine, so that the brackets may be adjusted lengthwise the same to vary their spacing as required. The guidance and support provided for the series of cables by the series of tensioning roller brackets not only space the cables as required, but automatically readjust that spacing as the brackets themselves are readjusted.

Due to the close arrangement of the jaws in both the series of stationary and movable jaws and the tendency to overheat the jaws, it is desirable to provide means for artificially cooling the jaws, especially when it is desired to speed up the operation of the machine with a view to an increased output.

In Figs. 3 to 6 I have shown provision for the artificial cooling of the jaw members of both series by the application of cooling water, the latter being so introduced that its cooling effect is greatest near the middle of each series of jaws where the heat is apt to be the most persistent, and is further so introduced that relative adjustment of the jaws for variable spacing is not interfered with.

Referring first to Figs. 3 and 4 and to the series of stationary jaw members, the holding arm of each jaw member is provided internally with a water circulating conduit formed by drilling into the upper face thereof two vertical parallel passages 143 connected at the bottom by a cross passage 145. Into each vertical passage there is threaded a nipple 147 to which there is secured one end of a flexible pipe.

Figure 6:
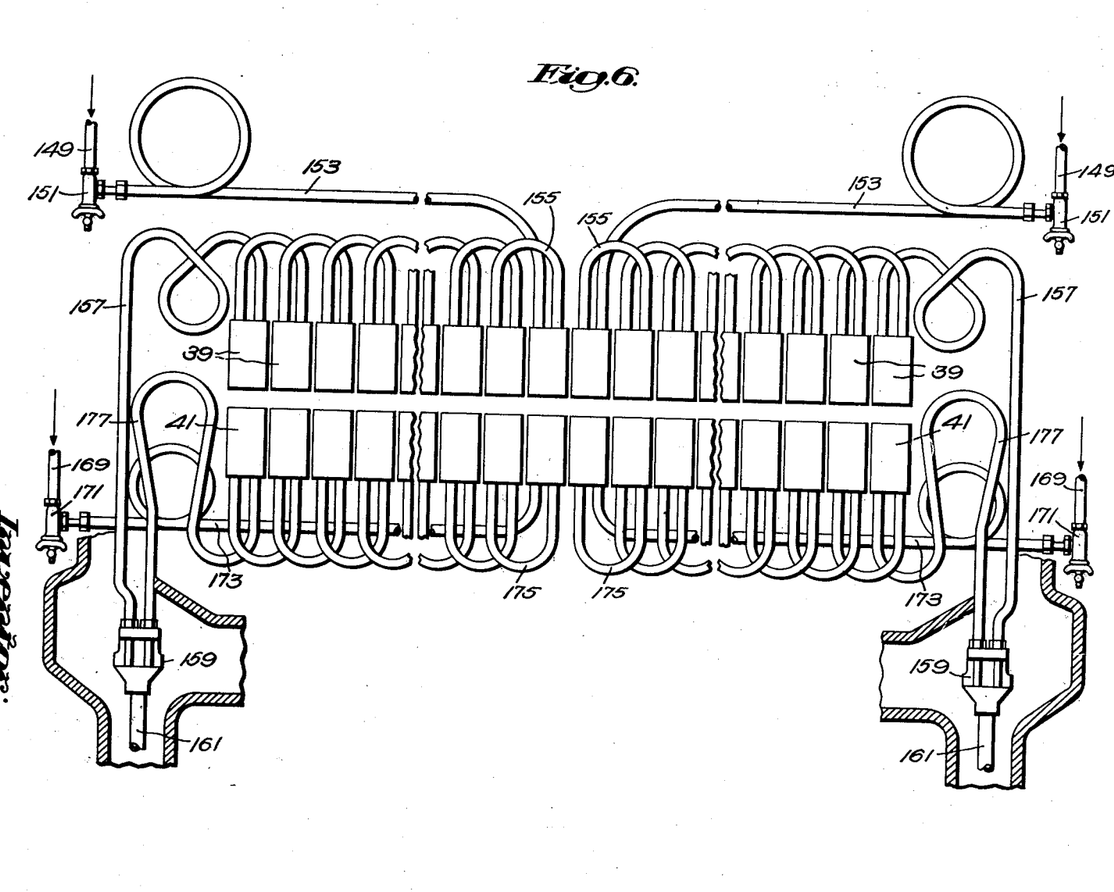
Fig. 6 shows the pipe connections between successive jaw members of each series and the path through which the cooling fluid circulates.

The preferred method of circulating cooling water through the series of jaws is indicated in Fig. 6. As there shown, the jaws are divided into two groups, one comprising those at the right of the middle of the series and the other those at the left thereof. The cooling water is supplied through pipes 149, one at each opposite side of the machine, each pipe being connected to a strainer valve 151. Each strainer valve is connected to a flexible pipe length 153 which has one or more coils to permit such extension or contraction thereof as is required for any readjustment of the spacing of the jaws. Each pipe 153 is connected to the nipple at the outer side of the inner jaw member of the corresponding group. The opposite nipple of each inner jaw member is then connected by a loop of flexible pipe 155 with the outer nipple of the next adjacent jaw member of that group. A similar pipe connection is had between the inner nipple of the last mentioned jaw member and the outer nipple of the next succeeding jaw member. Similar pipe connections are provided between the adjacent succeeding jaws of each group.

Cooling water is accordingly first delivered to the inner jaws of each group where cooling by radiation is least effective and passes thence through the succeeding jaws to the outer jaw of the group, whence it is discharged through a pipe 157 and pipe connection 159 to the discharge pipe 161. The removal of the circuit breaking switches to the front of the machine provides ample space for the pipe connections between adjacent jaws, and by arranging the loop connections 155 as described they are so related to the adjoining jaws as to permit a wide range of relative adjustment in the spacing of the jaws.

A similar provision is made for circulating cooling water through the movable jaws. In the case of the latter (Figs. 3 and 5), each jaw member is drilled from beneath to provide two parallel, vertical passages 163 connected each with a forwardly inclined passage 165, the latter passages being connected by the cross passage 167. The movable jaws are also divided into right and left hand groups and cooling water is circulated through these passages through paths similar to those provided in the case of stationary jaws. The water is delivered to the two groups of jaws (Fig. 6) through the supply pipes 169 and strainer valves 171, and thence to the inner jaw member of each group through flexible pipes 173, whence it circulates outwardly through the successive jaws of each group by means of successive pipe connections 175 similar to those employed in the case of the stationary jaws, being discharged from the outer jaw members of the two groups through flexible pipes 177 which are connected to the pipe connections 159 and the discharge pipes 161.

While I have herein shown and described for the purposes of illustration one specific embodiment of the invention, it is to be understood that extensive deviations and changes in the construction, form and relative arrangement of parts may be made, all without departing from the spirit of the invention.

I claim:

1. In a machine for electrically welding wire fabric, the combination with a series of stationary welding jaws, of a series of movable welding jaws, the same presenting successive pairs of cooperating, relatively movable jaws for welding a series of strand wires and transverse stay wires, means for moving said movable jaws toward the stationary jaws to effect a weld, supports extending transversely the machine on which said jaws are adjustably mounted to permit the adjustment of the spacing of successive pairs, and means for circulating cooling fluid through successive jaws, comprising means for supplying said fluid to inner members of each series, flexible conduits connecting successive members to cause the fluid to circulate outwardly in opposite directions through the series from the inner members to the outer members thereof.

2. In a machine for electrically welding wire fabric, the combination with two series of welding jaws forming successive pairs of relatively movable jaws for welding a series of strand wires and transverse stay wires, of means for supplying cooling fluid to inner members of each series, conduits interconnecting the members of each section so related as to cause the cooling fluid to circulate outwardly in opposite directions through the series to the outer members thereof.

3. In a machine for electrically welding wire fabric, the combination with a series of stationary welding jaws, of a complemental series of yieldably mounted, movable welding jaws for welding the strand and stay wires with means for causing the jaws to grasp the parts to be welded, a carrier for the series of movable jaws extending across the front of the machine, a series of primary circuit breaking switches, one for each pair of jaws, supported at the front of the machine and adapted to be actuated by the movement of the movable jaws, the parts of said machine being so related as to provide a space extending transversely above the series of stationary jaws, and pipe connections for the series of stationary jaws arranged in said space for conveying cooling fluid therethrough.

4. In a machine for electrically welding wire fabric, the combination with a series of pairs of relatively movable welding jaws for welding a series of strand wires and transverse stay wires, of means for feeding the strand wires between pairs of jaws and also for positioning the stay wires transversely between the jaws, primary circuit conductors passing between the strand wires, a series of brackets carrying tensioning rollers engaging the strand wires below the jaws, and supports on said brackets for engaging and holding said conductors.

5. In a machine for electrically welding wire fabric, the combination with a series of stationary welding jaws and a complemental series of movable welding jaws for welding vertically disposed strand wires and transversely arranged stay wires, of a reciprocating jaw carrier for supporting the series of movable jaws and extending across the front of the machine, each jaw having an actuating rod yieldably mounted for sliding movement in the carrier and having an end protruding from the front of said carrier, a spring for the rod adapted to yield to permit the carrier to move relatively to the rod, a stop on the rod to limit its forward movement with relation to the carrier, a supporting member extending across the front of the machine beneath the jaw carrier, a series of primary circuit breaking switches mounted on said supporting member, one for each movable jaw, each of said switches being provided with a movable contact carrying arm and a latch for locking said contact in its closed position, a latch engaging member mounted on the protruding end of the rod and adapted to move the latch to release the contact carrying arm and open the switch on advance movement of the rod relatively to the carrier, and a projection on the carrier adapted to engage the contact carrying arm and close the switch on the jaw opening movement of the carrier.

6. In a machine for welding wire fabric, the combination with a series of stationary welding jaws and a complemental series of movable welding jaws for welding strand and stay members, of a reciprocating jaw carrier supporting the series of movable jaws and extending across the front of the machine, an actuating rod for each movable jaw yieldably mounted for sliding movement in the carrier and adapted to move relatively to the carrier to provide an upsetting movement during welding, said rod having an end protruding through the front of said carrier, a supporting member extending across the front of the machine, a series of primary circuit breaking switches for each movable jaw mounted on said supporting member, a contact breaking device carried by the protruding end of each jaw actuating rod and cooperatively related to the corresponding switch to open the latter during the upsetting movement of the jaw, and a contact making device for each switch supported on the jaw carrier and cooperatively related to the switch to close the same on the opening movement of the jaws.

7. In a welding machine for welding wire fabric, the combination with a series of movable welding jaws, of a reciprocating jaw carrier extending across the front of the machine in which said series of jaws is supported, a jaw actuating member for each jaw yieldably mounted in the carrier for movement relatively thereto to provide an upsetting movement during welding, a supporting member extending across the front of the machine beneath the jaw carrier, a series of primary circuit breaking switches mounted on said supporting member, means on said jaw carrier for closing each of said switches, and means carried by each jaw actuating member for opening the corresponding switch during said upsetting movement.

8. In a machine for electrically welding wire fabric, the combination with a transverse, closely arranged series of stationary welding jaws, each with its secondary conductor bar, of a series of movable welding jaws having each a conductor bar underlying that of the stationary jaw member, said stationary jaws having each an internal fluid circulating conduit with supply and discharge openings formed in the top of the jaw, a series of conduits arranged transversely in the space above said jaws and interconnecting the internal fluid conduits of said jaws, and means for circulating cooling fluid through the conduits and said jaws.

9. In a machine for electrically welding wire fabric, the combination with two transverse series of closely arranged, welding jaws forming successive pairs of relatively movable jaws for welding a series of strand wires and transverse stay wires, one of said series being stationary and the other movable, said jaws being transversely adjustable for changing the spacing between successive pairs, said jaws having each an internal fluid circulating conduit with supply and discharge openings formed laterally in the jaw, of conduits arranged in a space laterally of said jaws and extending transversely the machine, said conduits interconnecting the internal fluid circulating conduits of the jaws, and means for circulating cooling fluid through the said conduits and said jaws.

10. In a machine for electrically welding wire fabric, the combination with a transverse, closely arranged series of stationary welding jaws, of a series of movable welding jaws, the same presenting successive pairs of cooperating, relatively movable jaws for welding a series of strand wires and transverse stay wires, supports extending transversely the machine on which said jaws are adjustably mounted to permit adjustment of the spacing between successive pairs, the parts of said machine being so related as to leave a space transversely and above said series of stationary jaws for connecting fluid conduits, and flexible conduits arranged in said space and interconnecting the jaw members of said stationary series for circulating cooling fluid therethrough.

11. In a machine for electrically welding wire fabric, the combination with a transverse, closely arranged series of stationary welding jaws, of a series of movable welding jaws, the same presenting successive pairs of cooperating, relatively movable jaws for welding a series of strand wires and transverse stay wires, supports extending transversely the machine on which said jaws are adjustably mounted to permit adjustment of the spacing between successive pairs, the parts of said machine being so related as to leave a space transversely and above said series of stationary jaws for connecting fluid conduits, flexible conduits arranged in said space and interconnecting the jaw members of said stationary series for circulating cooling fluid therethrough, and other flexible conduits interconnecting the jaw members of said movable series.

12. In a machine for electrically welding wire fabric, the combination with a transverse, closely arranged series of stationary welding jaw members, of a series of movable welding jaw members, the same presenting successive pairs of cooperating, relatively movable jaws for holding a series of strand wires and transverse stay wires, means for moving said movable jaws toward the stationary jaws to effect the weld, supports extending transversely the machine on which said jaws are adjustably mounted to permit the adjustment of the spacing between successive pairs, a series of flexible conduits extending transversely the machine over one of said series of jaw members, and a second series of such conduits extending transversely the machine below the other series of jaw members and interconnecting said jaw members for circulating cooling fluid through the jaw members of each series.

13. In a machine for electrically welding wire fabric, the combination with a transverse series of closely arranged, stationary welding jaws, of a series of movable welding jaws, the same presenting pairs of cooperating jaws for welding a series of strand wires and transverse stay wires, said jaws being transversely adjustable to permit adjustment of the spacing between successive pairs, the parts of said machine being so related as to provide a space extending transversely across the machine and adjacent said stationary jaws, and a transverse series of flexible conduits arranged in said space and interconnecting the jaw members of said stationary series for circulating cooling fluid therethrough.

14. In a machine for electrically welding wire fabric, the combination with a closely arranged, transverse series of stationary welding jaws, of a series of movable welding jaws, the same presenting pairs of relatively movable jaws for welding a series of strand wires and transverse stay wires, a common reciprocatory support for the movable jaws extending transversely across the front of the machine, means for feeding strand wires between pairs of jaws and also for positioning the stay wires transversely between the jaws, a transverse, closely arranged series of primary circuit breaking switches, a support for said switches extending across the front of the machine beneath said reciprocatory support and maintaining said switches in position to be actuated by the movement of said movable jaws, whereby the operating parts of said switches are readily accessible and visible from the front of the machine, and means carried by said reciprocatory support for actuating said switches.

15. In a machine for electrically welding wire fabric, the combination with a closely arranged, transverse series of stationary welding jaws, of a series of movable welding jaws, the same presenting pairs of relatively movable jaws for welding a series of strand wires and transverse stay wires, a common reciprocatory support for the movable jaws extending transversely across the front of the machine, means for feeding strand wires between pairs of jaws and also for positioning the stay wires transversely between the jaws, a transverse, closely arranged series of primary circuit breaking switches, a support for said switches extending across the front of the machine beneath said reciprocatory support and maintaining said switches in position to be actuated by the movement of said movable jaws, a series of switch opening members extending across the front of the machine, each movable with one of said movable jaws and operative to open the corresponding switch on advancing movement of the jaw, and a member depending from said reciprocatory support for closing said switches.

16. In a machine for electrically welding wire fabric, the combination with a closely arranged, transverse series of stationary welding jaws, of a series of movable welding jaws, the same presenting pairs of relatively movable jaws for welding a series of strand wires and transverse stay wires, a common reciprocatory support for the movable jaws extending transversely across the front of the machine, means for feeding the strand wires between pairs of jaws, a transverse, closely arranged series of primary circuit breaking switches, a support for said switches extending across the front of the machine in proximity to said reciprocatory support and maintaining said switches in position to be actuated by the movement of said movable jaws, a series of switch opening members extending across the front of the machine, each movable with one of said movable jaws and operative to open the corresponding switch on advancing movement of its jaws, means connected with said reciprocatory support for closing said switches, primary circuit conductors connected to each of said switches and extending between the strand wires from the front to the rear of the machine, a series of tensioning members engaging the strand wires below the jaws and adjustable transverse the machine, and a conductor attachment on said tensioning members for supporting said primary circuit conductors in spaced relation to each other and to said strand wires.

17. In a machine for electrically welding wire fabric, the combination with a closely arranged, transverse series of stationary welding jaws, of a series of movable welding jaws, the same presenting pairs of relatively movable jaws for welding a series of strand wires and transverse stay wires, a common reciprocatory support for the movable jaws extending transversely across the front of the machine, means for feeding the strand wires between pairs of jaws, a transverse, closely arranged series of primary circuit breaking switches, a support for said switches extending across the front of the machine in proximity to said reciprocatory support and maintaining said switches in position to be actuated by the movement of said movable jaws, a series of switch opening members extending across the front of the machine, each movable with one of said movable jaws and operative to open the corresponding switch on advancing movement of its jaw, and means connected with said reciprocatory support for closing said switches.

In testimony whereof, I have signed my name to this specification.

WILLIAM S. SOUTHWICK.